(12) United States Patent
Kono

(10) Patent No.: US 12,379,957 B2
(45) Date of Patent: Aug. 5, 2025

(54) ONBOARD ECU, INFORMATION PROCESSING METHOD, AND ONBOARD SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Tomoya Kono, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 414 days.

(21) Appl. No.: 17/760,400

(22) PCT Filed: Jan. 26, 2021

(86) PCT No.: PCT/JP2021/002623
§ 371 (c)(1),
(2) Date: Aug. 9, 2022

(87) PCT Pub. No.: WO2021/161778
PCT Pub. Date: Aug. 19, 2021

(65) Prior Publication Data
US 2023/0082383 A1 Mar. 16, 2023

(30) Foreign Application Priority Data
Feb. 13, 2020 (JP) .................................. 2020-022615

(51) Int. Cl.
*G06F 9/48* (2006.01)
*B60R 16/023* (2006.01)

(52) U.S. Cl.
CPC ........ *G06F 9/4812* (2013.01); *B60R 16/0231* (2013.01)

(58) Field of Classification Search
CPC ............................ G06F 9/4812; B60R 16/0231
See application file for complete search history.

(56) References Cited

U.S. PATENT DOCUMENTS

2015/0166074 A1 6/2015 Inomata et al.
2020/0314610 A1* 10/2020 Watanabe ............... H04W 4/80

FOREIGN PATENT DOCUMENTS

JP 2010-241298 A 10/2010
JP 2014-135025 A 7/2014
(Continued)

OTHER PUBLICATIONS

International Search Report, Application No. PCT/JP2021/002623, mailed Apr. 20, 2021. ISA/Japan Patent Office.

*Primary Examiner* — Zachary K Huson
(74) *Attorney, Agent, or Firm* — Honigman LLP

(57) ABSTRACT

Provided is an onboard ECU communicatively connected to a plurality of onboard apparatuses installed in a vehicle and a vehicle control apparatus that performs priority determination relating to control of the onboard apparatuses that includes a control unit that executes processing relating to the control of the onboard apparatuses, wherein in a case where there is conflict in control targeting one onboard apparatus from among the plurality of onboard apparatuses or an associated onboard apparatus group, the control unit executes priority determination for the control; and an onboard apparatus which is a target for priority determination by the control unit and an onboard apparatus which is a target for priority determination by the vehicle control apparatus overlap at least at a portion.

18 Claims, 4 Drawing Sheets

(56) References Cited

FOREIGN PATENT DOCUMENTS

| JP | 2017-030633 A | 2/2017 |
|----|---------------|--------|
| JP | 2018-085686 A | 5/2018 |

* cited by examiner

ONBOARD ECU, INFORMATION PROCESSING METHOD, AND ONBOARD SYSTEM

CROSS-REFERENCE TO RELATED APPLICATIONS

This application is the U.S. national stage of PCT/JP2021/002623 filed on Jan. 26, 2021, which claims priority of Japanese Patent Application No. JP 2020-022615 filed on Feb. 13, 2020, the contents of which are incorporated herein.

TECHNICAL FIELD

The present disclosure relates to an onboard ECU, and an information processing method, and an onboard system.

BACKGROUND

A vehicle is installed with a control system for controlling onboard apparatuses, such as an engine, a transmission, a motor generator, a brake apparatus, a steering apparatus, and the like (for example, see JP 2017-30633A). A control system of JP 2017-30633A executes priority determination processing in a case where control signals targeting the same onboard apparatus conflict.

The control system of JP 2017-30633A has a configuration in which a single functional unit determines priority for the onboard apparatus which is the target for control by the control system. Thus, in a case where there are conflicting controls targeting the onboard apparatus, the conflicting controls may make determining the priority difficult.

The present disclosure is directed at providing an onboard ECU and the like that are capable of efficiently determining the priority for conflicting controls in a case where there are conflicting controls targeting an onboard apparatus.

SUMMARY

An onboard ECU according to an aspect of the present disclosure is an onboard ECU communicatively connected to a plurality of onboard apparatuses installed in a vehicle and a vehicle control apparatus that performs priority determination relating to control of the onboard apparatuses that includes a control unit that executes processing relating to the control of the onboard apparatuses, wherein in a case where there is conflict in control targeting one onboard apparatus from among the plurality of onboard apparatuses or an associated onboard apparatus group, the control unit determines priority of the control; and an onboard apparatus which is a target for priority determination by the control unit and an onboard apparatus which is a target for priority determination by the vehicle control apparatus overlap at least at a portion.

Effects of Present Disclosure

According to the present disclosure, provided is an onboard ECU and the like that are capable of efficiently executing processing relating to determining the priority for conflicting controls in a case where there are conflicting controls targeting an onboard apparatus.

DETAILED DESCRIPTION OF PREFERRED EMBODIMENTS

Figure 1:
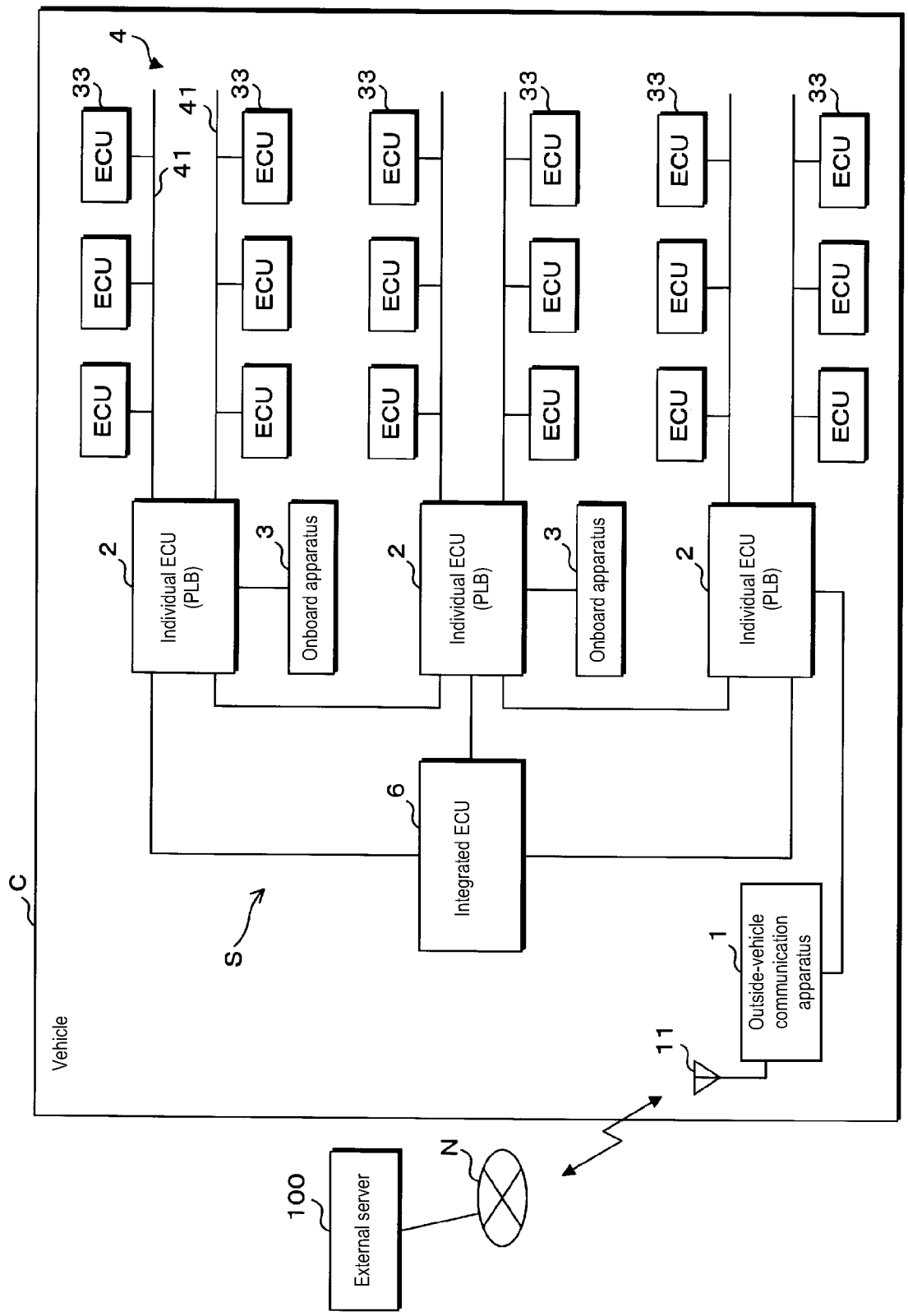
FIG. 1 is a schematic diagram illustrating an example of a system configuration including individual ECUs (onboard ECUs) and an integrated ECU (vehicle control apparatus) according to a first embodiment.

Firstly, embodiments of the present disclosure will be listed and described. One or more parts of the embodiments described below may be combined in a discretionary manner.

First Aspect

An onboard ECU according to a first aspect of the present disclosure is an onboard ECU communicatively connected to a plurality of onboard apparatuses installed in a vehicle and a vehicle control apparatus that performs priority determination relating to control of the onboard apparatuses includes a control unit that executes processing relating to the control of the onboard apparatuses, wherein in a case where there is conflict in control targeting one onboard apparatus from among the plurality of onboard apparatuses or an associated onboard apparatus group, the control unit determines priority of the control; and an onboard apparatus which is a target for priority determination by the control unit and an onboard apparatus which is a target for priority determination by the vehicle control apparatus overlap at least at a portion.

In the first aspect, in a case where there are conflicting controls targeting an onboard apparatus, the control unit of the onboard ECU determines priority for the conflicting controls. The onboard apparatus which is the target for priority determination by the onboard ECU and the onboard apparatus which is the target for priority determination by the vehicle control apparatus overlap at least at a portion. Processing relating to determining the priority for the same onboard apparatus is split or shared by the vehicle control apparatus and the onboard ECU which is a separate apparatus to the vehicle control apparatus. This allows the processing relating to determining the priority to be efficiently executed.

Second Aspect

In the onboard ECU according to a second aspect of the present disclosure, priority determination by the control unit is prioritized over priority determination by the vehicle control apparatus.

In the second aspect, priority determination by the control unit of the onboard ECU is prioritized over priority determination by the vehicle control apparatus. Thus, even in a case where the processing load of the vehicle control apparatus is high, by prioritizing the priority determination by the control unit of the onboard ECU, delay in the control can be minimized or prevented on the basis of the priority determination targeting the onboard apparatus which is the target for priority determination and the priority determination result.

Third Aspect

The onboard ECU according to a third aspect of the present disclosure further includes a relay control unit that supplies or cuts off supply of electric power to a communication unit for communicating with the onboard apparatuses or the onboard apparatuses, wherein the onboard apparatus which is a target for priority determination by the control unit is directly connected to the ECU via the communication unit or the relay control unit.

In the third aspect, the onboard ECU is provided with a relay control unit that supplies or cuts off supply of electric power to the communication unit for communicating with the onboard ECU or the onboard apparatus. Because the onboard apparatus directly connected to the ECU via the communication unit or the relay control unit is the onboard apparatus which is the target for priority determination by the control unit, the onboard ECU can efficiently output information relating to control based on the priority determination result to the onboard apparatus which is the target for priority determination.

Fourth Aspect

In the onboard ECU according to a fourth aspect of the present disclosure, the plurality of onboard apparatuses include a first onboard apparatus and a second onboard apparatus that outputs information relating to control with a higher urgency than information relating to control output by the first onboard apparatus; and the control unit, in a case where information relating to control output from the first onboard apparatus has been acquired, relays the information relating to control output from the first onboard apparatus to the vehicle control apparatus, and in a case where information relating to control output from the second onboard apparatus has been acquired, executes processing for determining priority on the basis of the information relating to control output from the second onboard apparatus.

In the fourth aspect, in a case where information relating to control output from the first onboard apparatus has been acquired, the control unit of the onboard ECU relays the information to the vehicle control apparatus. Also, in a case where information relating to control output from the second onboard apparatus which is information with a higher urgency than the information from the first onboard apparatus has been acquired, the control unit executes processing for determining the priority on the basis of the information. Accordingly, when executing the processing relating to determining the priority of the same onboard apparatus, normally the vehicle control apparatus determines the priority, but in the case of a priority determination based on information relating to control with high urgency such as when the required time for control is short and determining in real time is requested, the onboard ECU performs this. This allows for urgency requirements relating to vehicle control to be efficiently handled.

Fifth Aspect

In the onboard ECU according to a fifth aspect of the present disclosure, the control unit acquires information relating to control based on a result of priority determination by the vehicle control apparatus, acquires the information relating to control output from the second onboard apparatus, and executes processing for determining priority on the basis of information relating to control based on the acquired result of priority determination by the vehicle control apparatus and the information relating to control output from the second onboard apparatus.

In the fifth aspect, the control unit of the onboard ECU executes processing for determining priority on the basis of information relating to control based on the priority determination result from the vehicle control apparatus and information relating to control output from the second onboard apparatus. This allows for processing relating to priority determination to be executed efficiently.

Sixth Aspect

In the onboard ECU according to a sixth aspect of the present disclosure, a level of the urgency is determined on the basis of Automotive Safety Integrity Level (ASIL) of ISO26262; and urgency of the control increases as a safety level of ASIL relating to control targeting an onboard apparatus which is a target for priority determination increases.

In the sixth aspect, the level of urgency is determined on the basis of the ASIL of ISO26262, or in other words, the urgency increases as the safety level of the ASIL increases. Accordingly, the priority of control with high urgency in accordance with the safety level can be efficiently determined.

Seventh Aspect

In the onboard ECU according to a seventh aspect of the present disclosure, in a case where an interrupt processing is included in the conflicting plurality of controls, the control unit prioritizes the interrupt processing over priority determination by the vehicle control apparatus and determines priority for the conflicting plurality of controls.

In the seventh aspect, whether there is interrupt processing is considered in the priority determination by the control unit of the onboard ECU. In other words, priority determination based on the interrupt processing by the control unit of the onboard ECU is prioritized over priority determination by the vehicle control apparatus. Thus, even in a case where the processing load of the vehicle control apparatus is high, by prioritizing the priority determination by the control unit of the onboard ECU, delay in the control can be minimized or prevented on the basis of the priority determination targeting the onboard apparatus which is the target for priority determination and the priority determination result.

Eighth Aspect

In the onboard ECU according to an eighth aspect of the present disclosure, the onboard apparatus that outputs information relating to the interrupt processing is directly connected to the ECU.

In the eighth aspect, the onboard apparatus that outputs information relating to interrupt processing is directly connected to the ECU. Thus, the control unit can minimize or prevent delay in acquiring the information relating to the interrupt processing and can execute priority determination for a plurality of conflicting controls in accordance with whether or not there is an interrupt processing.

Ninth Aspect

An information processing method according to a ninth aspect of the present disclosure that causes a computer to execute processing includes determining priority for controls in a case where there is a conflict between controls targeting an onboard apparatus or an onboard apparatus group with at least a portion overlapping an onboard apparatus or an associated onboard apparatus group which is a target for priority determination by a vehicle control apparatus that perform priority determination relating to control of an onboard apparatus.

The ninth aspect is directed at providing an information processing method that causes a computer to function as an onboard ECU capable of efficiently executing priority determination for conflicting controls in a case where there are a plurality of conflicting controls targeting an onboard apparatus.

Tenth Aspect

An onboard system according to a tenth aspect of the present disclosure includes a vehicle control apparatus communicatively connected to a plurality of onboard apparatuses installed in a vehicle; and a plurality of onboard ECUs communicatively connected to the plurality of onboard apparatuses, wherein the onboard ECUs and the vehicle control apparatus include a control unit that, in a case where there are conflicting controls targeting one of the onboard apparatuses or an associated onboard apparatus group from among the plurality of onboard apparatuses, performs priority determination for the controls; and an onboard apparatus which is a target for priority determination by the control unit of the vehicle control apparatus and an onboard apparatus which is a target for priority determination by the control unit of the vehicle control apparatus overlap at least at a portion.

In the tenth aspect is directed at providing an onboard system capable of efficiently executing priority determination for conflicting controls in a case where there are a plurality of conflicting controls targeting an onboard apparatus.

The present disclosure will be described in detail below with reference to diagrams of embodiments of the present disclosure. An onboard ECU (individual ECU 2) according to an embodiment of the present disclosure will be described with reference to the following diagrams. Note that the present disclosure is not limited to these examples. The present disclosure is defined by the scope of the claims, and all modifications that are equivalent to or within the scope of the claims are included.

First Embodiment

Figure 2:
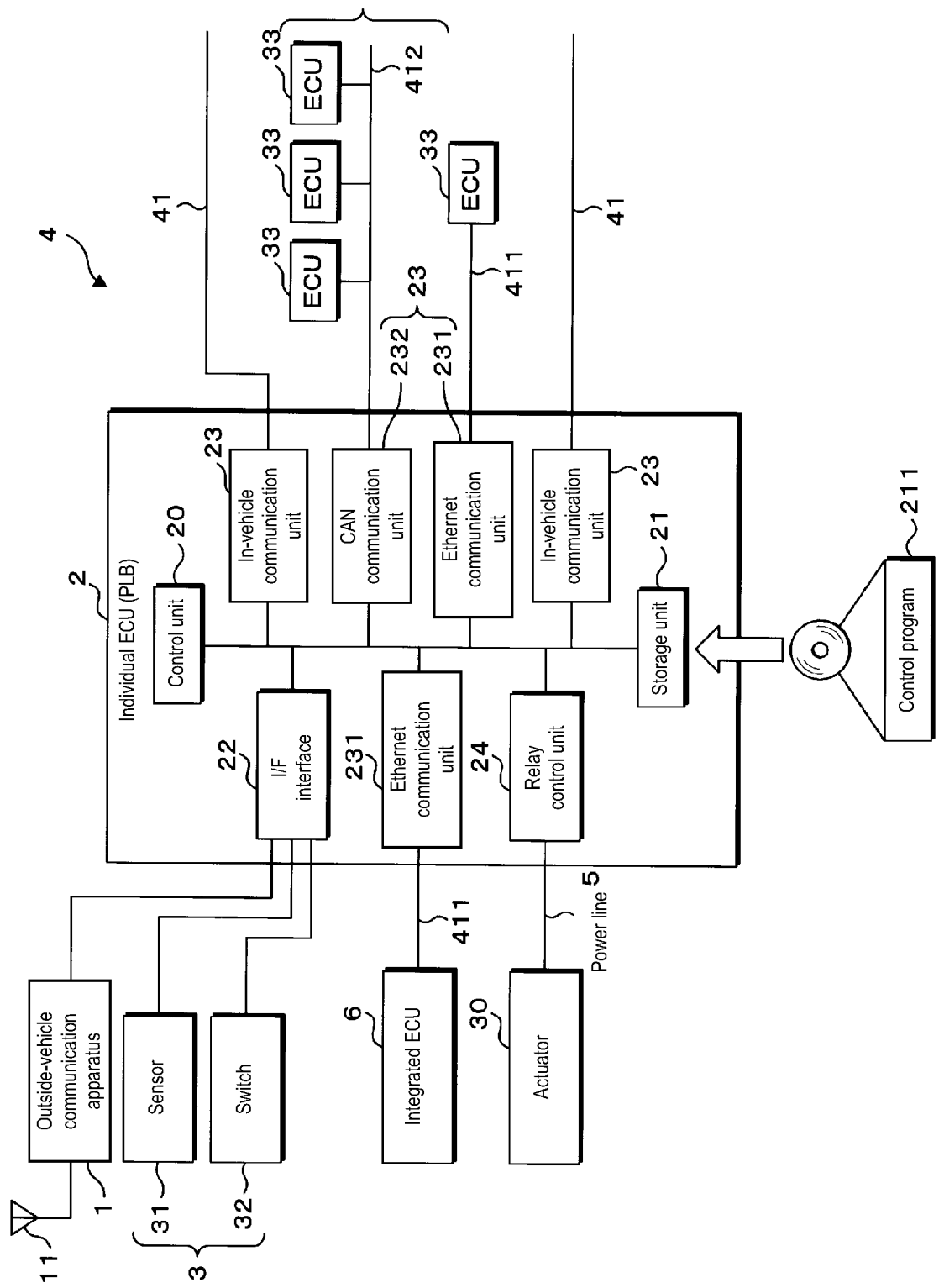
FIG. 2 is a block diagram illustrating an example of an inner configuration of the individual ECU (onboard ECU).

An embodiment will be described below with reference to diagrams. FIG. 1 is a schematic diagram illustrating an example of a system configuration including the individual ECUs 2 (onboard ECUs) and an integrated ECU 6 (vehicle control apparatus) according to the first embodiment. FIG. 2 is a block diagram illustrating an example of an inner configuration of the individual ECU 2 (onboard ECU).

An onboard system S includes the plurality of individual ECUs 2 (onboard ECUs) installed in a vehicle, a plurality of onboard apparatuses 3, and the integrated ECU 6 (vehicle control apparatus). The individual ECUs 2 are relay control ECUs disposed in each area of the vehicle, with each one functioning as an onboard relay apparatus, such as a gateway or an Ethernet switch for relaying communications between onboard apparatuses 3 connected to the individual ECU 2 via an onboard network 4 or relaying communications between the onboard apparatus 3 and the integrated ECU 6. The individual ECU 2 corresponds to an onboard ECU with the function of determining the priority of control in a case where there is a conflict of control targeting one of the onboard apparatuses 3 or an associated onboard apparatus 3 group. The individual ECU 2 may be a Power Lan Box (PLB) that, in addition to relaying communications, may function as a power distribution apparatus that distributes and relays power output from an electrical energy storage apparatus and supplies power to the onboard apparatus 3 connected to the ECU.

The integrated ECU 6 is a central control apparatus such as a vehicle computer that generates and outputs control signals to the individual onboard apparatuses 3 on the basis of data from the onboard apparatuses 3 relayed via the individual ECUs 2. The integrated ECU 6 corresponds to a vehicle control apparatus with the function of determining the priority of control in a case where there is a conflict of control targeting one of the onboard apparatuses 3 or an associated onboard apparatus 3 group.

The onboard apparatus 3 includes various sensors 31 including Light Detection and Ranging (LiDAR), a light sensor, a CMOS camera, an infrared sensor; a switch 32 such as a fog lamp switch, a manual switch; an actuator 30 for a lamp apparatus 301 (see FIG. 3) such as a headlight; and ECUs 33 such as a failure detection ECU 331.

In a case where there is conflict between a plurality of controls targeting one of the onboard apparatuses 3, the individual ECU 2 and the integrated ECU 6 execute processing (priority determination processing) for determining the priority of the plurality of controls. Of the onboard apparatuses 3 that are the targets for priority determination by the individual ECU 2 and the integrated ECU 6, at least a portion of the onboard apparatuses 3 overlap. In other words, processing to determine the priority is executed by both the individual ECU 2 and the integrated ECU 6 for the same onboard apparatus 3. The priority determination processing will be described in detail below.

An external server 100 is a computer such as a server connected to the outside-vehicle network N, such as the Internet or a public network and is provided with a storage unit constituted by a random access memory (RAM), a read only memory (ROM), a hard disk, or the like. Each individual ECU 2 may be communicatively connected to an outside-vehicle communication apparatus 1, may communicate with the external server 100 connected to the outside-vehicle communication apparatus 1 via an outside-vehicle network N, and may relay communications between the external server 100 and the onboard apparatuses 3 installed in a vehicle C.

The vehicle C is installed with the integrated ECU 6, the outside-vehicle communication apparatus 1, the individual ECU 2, and a plurality of onboard apparatuses 3. The individual ECU 2 and the outside-vehicle communication apparatus 1 are communicatively connected via a wire harness such as a serial cable, for example. The individual ECU 2 and the onboard apparatuses 3 are communicatively connected via a communication line 41 and the onboard network 4 compatible with a communication protocol, such as a control area network (CAN, registered trademark) or Ethernet (registered trademark). The communication protocol of the individual ECU 2 and the onboard apparatuses 3 may be LIN, MOST, FlexRay, or the like. Also, the individual ECU 2 and the onboard apparatuses 3 may be communicatively connected via a wire harness such as a serial cable, for example.

The outside-vehicle communication apparatus 1 includes an outside-vehicle communication unit (not illustrated) and an I/O interface (not illustrated) for communicating with the individual ECU 2. The outside-vehicle communication unit is a communication apparatus for wireless communication using a mobile communication protocol, such as 3G, Long-Term Evolution (LTE, registered trademark), 4G, WiFi, or the like. The outside-vehicle communication unit communicates with the external server 100 via an antenna 11 connected to the outside-vehicle communication unit to transmit and receive data. The communications between the outside-vehicle communication apparatus 1 and the external server 100 are performed via an external network N, such as a public network, the Internet, or the like. The I/O interface is a communication interface for serial communication with the individual ECU 2, for example. The outside-vehicle communication apparatus 1 and the individual ECU 2 communicate with one another via the I/O interface and a wire harness such as a serial cable connected to the I/O interface. In the present embodiment, the outside-vehicle communication apparatus 1 is a separate apparatus from the individual ECU 2 and is communicatively connected thereto via the I/O interface or the like. However, no such limitation is intended. The outside-vehicle communication apparatus 1 may be built-in the individual ECU 2 as a component of the individual ECU 2.

The individual ECU 2 includes a control unit 20, a storage unit 21, an I/O interface 22, an in-vehicle communication unit 23, and a relay control unit 24. The in-vehicle communication unit 23 and the I/O interface 22 correspond to communication units for communicating with the onboard apparatus 3 connected to the individual ECU 2.

Each individual ECU 2, for example, functions as a gateway (relay device) that controls the segments of each system formed by the plurality of communication lines 41 of the onboard apparatus 3 of the recognition system, the onboard apparatus 3 of the determination system, the onboard apparatus 3 of the control system, and the like and that relays communications between the onboard apparatuses 3 between segments. Each communication line 41 corresponds to a bus in each segment (area), and the individual ECU 2 may function as an area control unit that manages the area connected to the ECU. Also, the individual ECU 2 is connected to an electrical energy storage apparatus (not illustrated) including a rechargeable battery such as a lithium ion battery and may function as a Power Lan Box (PLB) that distributes power supplied from the electrical energy storage apparatus to the onboard apparatuses 3 included in the segment managed by the ECU. The individual ECU 2 may be (a reprogramming master) configured to acquire, from the outside-vehicle communication apparatus 1, an update program received by the outside-vehicle communication apparatus 1 from the external server 100 via wireless communication and transmit the update program via the onboard network 4 to a predetermined onboard apparatus 3 (update target onboard apparatus 3).

The control unit 20 is constituted by a central processing unit (CPU), a micro processing unit (MPU), or the like and executes various types of control processing and calculation processing including the priority determination processing described above by reading out and executing a control program and data stored in advance in the storage unit 21.

The storage unit 21 is constituted by a volatile memory element such as random access memory (RAM) or a non-volatile memory element, such as read only memory (ROM), electrically erasable programmable ROM (EEPROM), flash memory, or the like, and, in the storage unit 21, the control program and data referenced when processing is executed is stored in advance. The control program stored in the storage unit 21 may be a control program read out from a storage medium 211 readable by the individual ECU 2. Also, the control program may be a control program downloaded from a non-illustrated external computer connected to a non-illustrated communication network and stored in the storage unit 21.

Relay path information (routing table) used when executing relay processing for communications between the onboard apparatuses 3, communications between the onboard apparatus 3 and the integrated ECU 6, or communications between the onboard apparatus 3 and the external server 100 is stored in the storage unit 21. The format of the relay path information is determined on the basis of the communication protocol. In a case where the communication protocol is CAN, CAN relay path information includes a message identifier (CAN-ID) included in a CAN message and a relay destination (I/O port number of a CAN communication unit 232) associated with the CAN-ID. In a case where the communication protocol is TCP/IP, TCP/IP relay path information includes a transmission destination address (MAC address or IP address) included in an IP packet and a relay destination (physical port number of an Ethernet communication unit 231) associated with the transmission destination address.

As with the I/O interface of the outside-vehicle communication apparatus 1, the I/O interface 22 is a communication interface for serial communication, for example. Via the I/O interface 22, the individual ECU 2 is communicatively connected to the outside-vehicle communication apparatus 1 and the onboard apparatuses 3, such as the sensor 31, the switch 32, the actuator 30.

The in-vehicle communication unit 23, for example, is an I/O interface (CAN communication unit 232, Ethernet communication unit 231) using a Control Area Network (CAN) or Ethernet (registered trademark) communication protocol. Also, the control unit 20 communicates with the onboard apparatus 3 connected to the onboard network 4 via the in-vehicle communication unit 23 or another relay apparatus or similar onboard device.

The Ethernet communication unit 231 is an Ethernet PHY unit for a TCP/IP packet transmitted by a 100 BASE-T1 or 1000 BASE-T1 Ethernet cable 411.

The CAN communication unit 232 is a CAN transceiver for a CAN message transmitted on a CAN bus 412 that receives a waveform produced by a potential difference of a differential voltage on the CAN bus 412 constituted by two wires on the high and low side and decodes the received waveform into a signal indicating a bit string of 1s and 0s. Also, the CAN communication unit 232 may include a CAN transceiver and a CAN controller.

A plurality of the in-vehicle communication units 23 (Ethernet communication unit 231, CAN communication unit 232) are provided, and each one of the communication lines 41 (Ethernet cable 411, CAN bus 412) constituting the onboard network 4, i.e., each bus, is connected to one of the in-vehicle communication units 23. By providing a plurality of the in-vehicle communication units 23 in this manner, the onboard network 4 is divided into a plurality of segments, and each segment may connect to the onboard apparatus 3 depending on the function (recognition system function, determination system function, control system function) of the onboard apparatus 3.

The relay control unit 24, for example, includes a Field effect transistor (FET) or similar semiconductor or a mechanical relay and is connected to the actuator 30 of the lamp apparatus 301, for example, via a power line 5. The relay control unit 24 supplies and cuts off supply of power to the onboard apparatus 3, the actuator 30 or the like, and controls the driving the actuator 30 connected to the power line 5 by turning the semiconductor switch on or off on the basis of a control signal (relay control signal) output from the control unit 20.

Using the relay control unit 24 including the semiconductor switch to control the driving of the actuator 30 is an example, and no such limitation is intended. The relay control unit 24 may be an actuator drive control unit for controlling the driving of the actuator 30 connected to the individual ECU 2. In other words, the actuator drive control unit for controlling the driving of the actuator 30 may output a control signal to the actuator 30 connected via the in-vehicle communication unit 23 or a communication unit including the I/O interface 22 and control the driving of the actuator 30. The actuator drive control unit may be a functional unit that functions by the control program being executed by the control unit 20.

The integrated ECU 6 and the plurality of individual ECUs 2 with such a configuration are communicatively connected to a ring network topology as illustrated in FIG.

1, for example. In other words, the integrated ECU 6 and the individual ECU 2 are provided with a plurality of the Ethernet communication units 231, and the ring network topology may be formed with redundancy allowing to communication with both directions. Also, in the ring network topology, the individual ECUs 2 not directly adjacent to the integrated ECU 6 and the integrated ECU 6 may be connected by the communication line 41 via the Ethernet cable 411 or the like forming a bypass line, allowing for further redundancy in the communication path. Furthermore, the integrated ECU 6 and the plurality of individual ECUs 2 may be communicatively connected via a bus network topology formed by the CAN bus 412.

Figure 3:
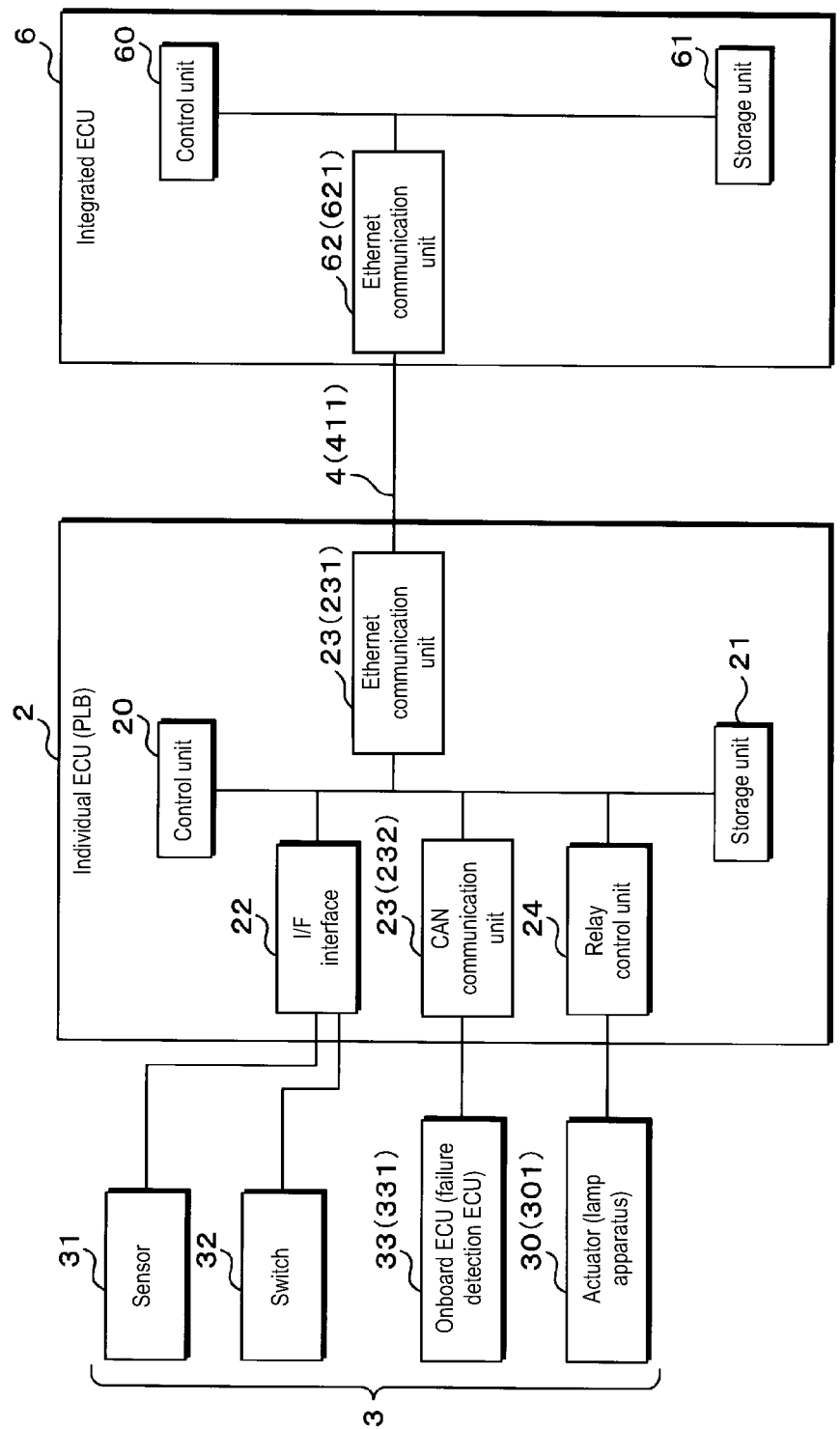
FIG. 3 is a schematic diagram illustrating an example of how the onboard ECUs (individual ECUs and integrated ECU) are connected.

FIG. 3 is a schematic diagram illustrating an example of how the onboard ECUs (individual ECU 2 and integrated ECU 6) are connected. The integrated ECU 6 (vehicle control apparatus), in a similar manner to the individual ECU 2, is provided with a control unit 60, a storage unit 61, and an in-vehicle communication unit 62 including an Ethernet communication unit 621 and is a central control apparatus such as a vehicle computer that controls the entire vehicle C, for example. The integrated ECU 6 may be configured to operate as a functional unit of the central control apparatus.

The control unit 20 of the individual ECU 2 functions as a relay unit 201, a control signal generation unit 202, and an interrupt processing reception unit 203 by the control program stored in the storage unit 21 being executed.

The relay unit 201 of the individual ECU 2 relays information output (transmitted) from the onboard apparatus 3 via the in-vehicle communication unit 23 or the I/O interface 22 to the integrated ECU 6, another onboard apparatus 3, or another individual ECU 2. In this manner, the onboard apparatus 3 that outputs information to be relayed to the integrated ECU 6 corresponds to a first onboard apparatus.

The control signal generation unit 202 of the individual ECU 2 generates a control signal for controlling the onboard apparatus 3 which is the target for priority determination on the basis of the information acquired from the onboard apparatus 3 via the in-vehicle communication unit 23 or the I/O interface 22 and outputs the control signal to the interrupt processing reception unit 203. In this manner, the onboard apparatus 3 that outputs the information acquired by the control signal generation unit 202 correspond to a second onboard apparatus. In other words, the onboard apparatus 3 includes the first onboard apparatus and the second onboard apparatus. The information output by the first onboard apparatus and the second onboard apparatus corresponds to information relating to the control of either of the onboard apparatuses or the control of an associated onboard apparatus. The information relating to controlling the output of the second onboard apparatus has a higher urgency than the information relating to controlling the output of the first onboard apparatus, but this will be described in more detail below.

When outputting the control signal generated by the interrupt processing reception unit 203, the control signal generation unit 202 may output the control signal as an interrupt processing signal to the interrupt processing reception unit 203. In this case, the onboard apparatus 3 that has output the information acquired via the in-vehicle communication unit 23 or the I/O interface 22 corresponds to the onboard apparatus 3 that outputs information relating to interrupt processing, with this including the second onboard apparatus described above.

The interrupt processing reception unit 203 of the individual ECU 2 acquires the control signal output from the control signal generation unit 202. As described above, in a case where the control signal output from the control signal generation unit 202 is an interrupt processing signal, the interrupt processing reception unit 203 acquires the interrupt processing signal output from the control signal generation unit 202. Also, the interrupt processing reception unit 203 acquires, via the in-vehicle communication unit 23, the control signal output from the integrated ECU 6, i.e., the control signal with the priority determined by the integrated ECU 6 (the control signal based on the priority determination result).

The interrupt processing reception unit 203 determines the final priority on the basis of the control signal (interrupt processing signal) output from the control signal generation unit 202 and the control signal with the priority determined by the integrated ECU 6 or the control signal output from the interrupt processing reception unit 203 and the control signal with the priority determined by the integrated ECU 6. In other words, in a case where, in a predetermined processing unit time, the interrupt processing reception unit 203 acquires only the control signal with the priority determined by the integrated ECU 6, the control signal with the priority determined by the integrated ECU 6 is set as the final priority control signal. In a case where, in a predetermined processing unit time, the interrupt processing reception unit 203 acquires only the control signal (interrupt processing signal) output from the control signal generation unit 202, the control signal (interrupt processing signal) output from the control signal generation unit 202 is set as the final priority control signal. In a case where, in a predetermined processing unit time, the interrupt processing reception unit 203 acquires the control signal with the priority determined by the integrated ECU 6 and the control signal (interrupt processing signal) output from the control signal generation unit 202, the control signal (interrupt processing signal) output from the control signal generation unit 202 is set as the final priority control signal.

The interrupt processing reception unit 203 generates a drive signal such as a relay control signal for controlling the onboard apparatus 3 in terms of activating, driving, stopping, suspending, and restarting the onboard apparatus 3 on the basis of the final priority determination result. The interrupt processing reception unit 203 outputs the generated relay control signal or similar drive signal to the relay control unit 24 connected to the onboard apparatus 3 which is the target for priority determination via the power line 5.

The relay control unit 24 turns the relay on or off on the basis of the relay control signal output from the interrupt processing reception unit 203 and performs drive control of the onboard apparatus 3 which is the target for priority determination.

The control unit 60 of the integrated ECU 6 functions as a control signal generation unit 601 and a priority determination unit 602 by the control program stored in the storage unit 21 of the ECU being executed.

The control signal generation unit 601 of the integrated ECU 6 acquires the information output (transmitted) from the onboard apparatus 3 relayed via the individual ECU 2, generates a control signal for controlling the onboard apparatus 3 which is the target for priority determination on the basis of the acquired information, and outputs the control signal to the priority determination unit 602. The onboard apparatus 3 which is the target for priority determination corresponds to the onboard apparatus 3 where there may be a conflict between a plurality of controls, and, in a case where there is a control between a plurality of controls targeting the onboard apparatus 3, the priority determination unit 602 determines the priority of control for the conflicting plurality of controls. In the present embodiment, as illustrated, the integrated ECU 6 may include a plurality of the control signal generation units 601 depending on the type or number of pieces of the acquired information.

The priority determination unit 602 of the integrated ECU 6 acquires the control signal output from each one of the plurality of control signal generation units 601 and executes processing (priority determination processing) to determine the priority of each acquired control signal. The priority determination unit 602 of the integrated ECU 6 generates a control signal for controlling the onboard apparatus 3 which is the target for priority determination on the basis of the priority determination processing result (priority determination result) and outputs (transmits) the control signal to the individual ECU 2. The generated control signal with the priority determined by the priority determination unit 602 is a control signal for the control with the highest importance from among the conflicting plurality of controls, for example. Also, the generated control signal with the priority determined by the priority determination unit 602 may be a control signal for a control selected from the conflicting plurality of controls from the perspective of protecting or guaranteeing the operations of the onboard apparatus which is the control target, for example.

A conflict between a plurality of controls may occur for the same onboard apparatus 3 which is the target for priority determination or an associated onboard apparatus 3 group. In a case where the onboard apparatus 3 which is the target for priority determination is the lamp apparatus 301 as in the present embodiment, for example, a case may occur where a request relating to control to turn on the lamp apparatus from a light sensor corresponding to an automatic light functional unit, a request relating to control to turn on the lamp apparatus from the fog lamp switch for turning on the fog lamp, and a request relating to control to turn on the lamp apparatus from the manual switch are all performed at roughly the same time or within a predetermined period (predetermined processing unit time), causing a conflict between the plurality of controls. Being roughly at the same includes a short period which is essentially the same time when considering the control quality and accuracy needed for executing priority determination processing. In this case, the priority determination unit 602 of the integrated ECU 6 executes processing for determining the priority of the plurality of controls and outputs a control signal as the priority determination result to the individual ECU 2 directly connected to the onboard apparatus 3 which is the target for priority determination. The priority determination by the priority determination unit 602 of the integrated ECU 6 may be executed on the basis of the priority of the conflicting plurality of controls or the state of the vehicle C at the point in time when there is a conflict between the plurality of controls.

The interrupt processing reception unit 203 of the individual ECU 2, as described above, determines the priority on the basis of the control signal output from the interrupt processing reception unit 203 and the control signal with the priority determined by the integrated ECU 6 or the control signal output from the interrupt processing reception unit 203 and the control signal with the priority determined by the integrated ECU 6. In a case where the interrupt processing reception unit 203 acquires the control signal output from the control signal generation unit 202 of the ECU and the control signal with the priority determined by the integrated ECU 6 at roughly the same time or within a predetermined period, the interrupt processing reception unit 203 performs priority determination and prioritizes the control signal output from the control signal generation unit 202 of the ECU, generates a drive signal such as a relay control signal, and outputs the drive signal to the relay control unit 24. In a case where the interrupt processing reception unit 203 acquires only the control signal output from the control signal generation unit 202 of the ECU at roughly the same time or within a predetermined period, the interrupt processing reception unit 203 generates a drive signal such as a relay control signal on the basis of the control signal and outputs the drive signal to the relay control unit 24.

In other words, the interrupt processing reception unit 203 receives two inputs, an input from the priority determination unit 602 of the integrated ECU 6 and an input from the control signal generation unit 202 of the ECU. In a case where there is an input from the priority determination unit 602 of the integrated ECU 6 or the interrupt processing reception unit 203 is waiting for an input from the priority determination unit 602 of the integrated ECU 6 and there is an input from the control signal generation unit 202 of the ECU, the interrupt processing reception unit 203 prioritizes processing based on the input from the control signal generation unit 202. In other words, the interrupt processing reception unit 203 may execute interrupt processing for processing relating to an input from the control signal generation unit 202 of the ECU by interrupting processing relating to an input from the priority determination unit 602 of the integrated ECU 6.

The individual ECU 2 is provided with a plurality of the control signal generation units 202, and a plurality of control signals may be output to the interrupt processing reception unit 203 at roughly the same time or within a predetermined time from each one of the control signal generation units 202. In this case, the interrupt processing reception unit 203 may execute processing relating to determining the priority on the basis of the plurality of control signals, generate a drive signal such as a relay control signal corresponding to the priority determination result, and output the drive signal to the relay control unit 24.

In a case where the interrupt processing reception unit 203 acquires the control signal with the priority determined by the integrated ECU 6 at roughly the same time or within a predetermined period, the interrupt processing reception unit 203 generates a drive signal such as a relay control signal on the basis of the control signal with the determined priority and outputs the drive signal to the relay control unit 24.

The functional units including the relay unit 201, the control signal generation unit 202, and the interrupt processing reception unit 203 of the individual ECU 2 are functional units of the control unit 20 of the individual ECU 2 in this example, but no such limitation is intended. One or more of the functional units of these functional units may be configured as a functional unit of a cloud server such as the external server 100 communicatively connected to the individual ECU 2, and the individual ECU 2 and the external server 100 may cooperate and execute a series of processing for the functional units.

The functional units including the control signal generation unit 202 and the interrupt processing reception unit 203 of the integrated ECU 6 are functional units of the control unit 20 of the individual ECU 2 in this example, but no such limitation is intended. One or more of the functional units of these functional units of the integrated ECU 6 may be configured as a functional unit of a cloud server such as the external server 100 communicatively connected to the integrated ECU 6, and the integrated ECU 6 and the external server 100 may cooperate and execute a series of processing for the functional units.

The onboard apparatus 3 includes the first onboard apparatus and the second onboard apparatus that outputs information relating to control with a higher urgency than information relating to control output by the first onboard apparatus. The level of the urgency, in other words, the urgency level, may be determined on the basis of the safety level defined as defined by the Automotive Safety Integrity Level (ASIL) of ISO26262, for example. The levels of the ASIL are classified as QM, ASIL-A, ASIL-B, ASIL-C, and ASIL-D levels. The QM level is typical quality management where functional safety per ISO26262 is not needed. In levels ASIL-A to ASIL-D, functional safety measures per ISO26262 are required, and the functional safety requirements become stricter as the level increases from ASIL-A to ASIL-D. In other words, the priority of the QM level is considered to be the lowest, and the priority of the ASIL-D level is considered to be the highest.

The priority determination processing and control executed by the individual ECU 2 and the integrated ECU 6 are specified as a control program or program module included in a control program and may include determining the level of the urgency for the control, in other words, the urgency level, on the basis of the ASIL safety level requested by the program. In other words, the urgency level increases as the ASIL safety level increases. By determining the level of the urgency on the basis of the ASIL of ISO26262, the priority of control with high urgency in accordance with the safety level can be efficiently determined.

The urgency level may be determined on the basis of the time (processing time) required for processing executed on the onboard apparatus 3 such as the actuator 30 which is the target for priority determination. In other words, less processing time requested for executing control may mean a higher urgency for the control. Thus, for one of the actuators 30, the processing time requested for control performed using the information output from the second onboard apparatus is shorter than the processing time requested for control performed using the information output from the first onboard apparatus. The processing time requested is, for example, the maximum amount of time needed for a series of processing from acquiring the information corresponding to the trigger for driving, executing priority determination processing, to generating and outputting a control signal, to drive one of the actuators 30. In a case where the processing time requested is 0.5 seconds, for example, the individual ECU 2 is requested to execute the series of processing from acquiring the information corresponding to the trigger for driving one of the actuators 30, executing priority determination processing, to generating and outputting a control signal within 0.5 seconds.

In the present embodiment, for example, in a case where the actuator 30 which is the target for priority determination is the lamp apparatus 301, the first onboard apparatus (onboard apparatus 3) is the sensor 31 such as a light sensor and the switch 32 such as the fog lamp switch or the manual switch, and the second onboard apparatus (onboard apparatus 3) is the failure detection ECU 331. The failure detection ECU 331 is connected to the individual ECU 2 via the CAN communication unit 232 and the CAN bus 412 and, for example, detects whether or not there is a failure or damage in the vehicle on the basis of a CAN message transmitted on the CAN bus 412. How the failure detection ECU 331 and the individual ECU 2 are connected is not limited to the CAN communication unit 232 and the CAN bus 412, and the Ethernet communication unit 231 and the Ethernet cable 411 may be used.

Determination of the priority of control for the lamp apparatus 301 which is the target for priority determination is performed by both the individual ECU 2 and the integrated ECU 6, and the lamp apparatus 301 is the onboard apparatus 3 overlapping with the onboard apparatus 3 which is the target for priority determination performed by the individual ECU 2 and the integrated ECU 6. In this manner, with the onboard apparatus 3 which is the target for priority determination performed by the individual ECU 2 and the onboard apparatus 3 which is the target for priority determination performed by the integrated ECU 6, by at least a portion of the onboard apparatuses 3 being overlapped, the function relating to priority determination processing can be split between the individual ECU 2 and the integrated ECU 6.

The sensor 31 such as the light sensor and the switch 32 such as the fog lamp switch or the manual switch output information relating to control of the lamp apparatus 301 in response to the lightness of the surrounding environment of the vehicle C, an operation or a behavior of the operator of the vehicle C. In a case where a failure or damage in the vehicle is detected, the failure detection ECU 331 outputs information relating to control of the lamp apparatus 301. In this case, the control performed on the basis of the information (information relating to control) output from the failure detection ECU 331 corresponding to the second onboard apparatus is given higher urgency (high urgency level) than the control performed on the basis of the information (information relating to control) output from the light sensor and the switch 32 such as the fog lamp switch corresponding to the first onboard apparatus.

In the present embodiment, in a case where the individual ECU 2 acquires information relating to control of the lamp apparatus 301 corresponding to the apparatus which is the target for priority determination from the sensor 31 such as the light sensor and the switch 32 such as the fog lamp switch and the manual switch corresponding to the first onboard apparatus, the individual ECU 2 relays the information to the integrated ECU 6.

The integrated ECU 6 acquires the information relayed from the individual ECU 2 after being output from the sensor 31 such as the light sensor and the switch 32 such as the fog lamp switch and the manual switch corresponding to the first onboard apparatus.

In the integrated ECU 6, the control signal generation unit 601 corresponding to the light sensor, the control signal generation unit 601 corresponding to the fog lamp switch, and the control signal generation unit 601 corresponding to the manual switch each generate a control signal on the basis of the acquired information and output it to the priority determination unit 602.

The priority determination unit 602 of the integrated ECU 6 executes priority determination processing on the basis of each control signal generated by the control signal generation unit 601 corresponding to the light sensor, the control signal generation unit 601 corresponding to the fog lamp switch, and the control signal generation unit 601 corresponding to the manual switch and outputs (transmits) the control signal corresponding to the priority determination result (control signal with the priority determined) to the individual ECU 2.

The individual ECU 2 generates the relay control signal on the basis of the control signal (control signal with the priority determined) output from the integrated ECU 6 and outputs the relay control signal to the relay control unit 24. Determination of the priority relating to control based on the information output from the first onboard apparatus, i.e., control with a relatively low urgency that is typically performed via an operation of the vehicle C is performed by the integrated ECU 6. Thus, control of the entire vehicle C is centralized by the integrated ECU 6, allowing control to be efficiently performed.

In a case where the individual ECU 2 acquires information relating to control of the lamp apparatus 301, which is the target for priority determination, from the ECU 33 such as the failure detection ECU 331 corresponding to the second onboard apparatus, the control signal generation unit 202 of the individual ECU 2 generates a control signal. The interrupt processing reception unit 203 determines the priority on the basis of the control signal, generate a relay control signal corresponding to the priority determination result, and outputs the relay control signal to the relay control unit 24.

Determination of the priority relating to control based on the information output from the second onboard apparatus, i.e., control with a high urgency that is performed in an emergency involving control of the vehicle C is performed by the individual ECU 2. Thus, control with high urgency can be performed in real time, and the responsiveness of the control can be improved. Furthermore, regarding control with high urgency, outputting (relaying) information relating to the control to the integrated ECU 6 can be made unnecessary. This reduces the processing load of the second onboard apparatus, makes receiving a response or the like from the integrated ECU 6 unnecessary, and reliably ensures the requested processing time.

In a case where the individual ECU 2 acquires the information relating to control output from one of the onboard apparatuses 3, the individual ECU 2 executes processing to identify or discriminate whether the priority determination based on the information relating to the control is to be performed by the interrupt processing reception unit 203 of the individual ECU 2 or performed by the priority determination unit 602 of the integrated ECU 6. In other words, the individual ECU 2 determines whether to determine the priority based on the information relating to the control with the ECU or to relay the information relating to control output from the onboard apparatus 3 to the integrated ECU 6 without determination being performed by the ECU.

In a case where the individual ECU 2 acquires information relating to the control output from the onboard apparatus 3 connected by a communication cable (dedicated communication cable) for connecting the ECU and the onboard apparatus 3 at the in-vehicle communication unit 23 and the I/O interface 22 which are communication units of the ECU, priority determination based on the information may be performed by the interrupt processing reception unit 203 included in the ECU. In a case where the individual ECU 2 acquires information relating to the control output from the onboard apparatus 3 connected by a communication cable (shared communication cable) shared with other onboard apparatuses 3 for connecting the ECU and the onboard apparatus 3 at the in-vehicle communication unit 23 and the I/O interface 22 which are communication units of the ECU, priority determination based on the information may not be performed, and the information may be relayed to the integrated ECU 6. A dedicated communication cable may be a wire harness such as a serial cable in a case where the individual ECU 2, i.e., the ECU, the onboard apparatus 3 are connected via the I/O interface 22 or may be the Ethernet cable 411 in a case where the individual ECU 2, i.e., the ECU, and the onboard apparatus 3 are connected via the Ethernet communication unit 231. In this case, the onboard apparatus 3 directly connected to the integrated ECU 6 by the dedicated communication cable corresponds to the first onboard apparatus. A shared communication cable may be the CAN bus 412 in a case where the individual ECU 2, i.e., the ECU, and the onboard apparatus 3 are connected via the CAN communication unit 232. In this case, the onboard apparatus 3 directly connected to the integrated ECU 6 by the shared communication cable corresponds to the second onboard apparatus.

In a case where information relating to control is acquired from at least one of the onboard apparatuses 3 from among the onboard apparatuses 3 directly connected to the individual ECU 2 via the dedicated communication cable, the individual ECU 2 executes priority determination processing based on the information at the control signal generation unit 202 and the interrupt processing reception unit 203 included in the ECU. Accordingly, the time required for control is reduced, and the requested processing time can be ensured. By directly connecting at least one of the onboard apparatuses 3 (second onboard apparatus) that outputs information relating to control with high urgency to the individual ECU 2 via the dedicated communication cable, for example, the bandwidth or transmission capacity for communications or signal transmission between the second onboard apparatus and the individual ECU 2 can be exclusively secured, allowing the responsiveness of the processing to be improved.

In a case where the individual ECU 2 acquires the information relating to control output from the onboard apparatus 3, whether to perform priority determination based on the information relating to the control at its own control signal generation unit 202 or whether to not perform this at the ECU and relay the acquired information to the integrated ECU 6 may be determined on the basis of identification information of the onboard apparatus 3 stored in the storage unit 21. The identification information, for example, may be information assigned to the IP address of the onboard apparatus 3 which is the transmission source of the information, with the information indicating whether the onboard apparatus 3 is the first onboard apparatus or the second onboard apparatus. Also, the identification information may be information assigned to a message identifier such as a CAN-ID included a message output from the onboard apparatus 3, for example, that corresponds to either the first onboard apparatus or the second onboard apparatus. Furthermore, the identification information may be added to or included in the relay path information described above and may indicate whether the onboard apparatus 3 that output the information relating to control is the first onboard apparatus or the second onboard apparatus. The individual ECU 2 can efficiently determine whether or not it is necessary to determine the priority using the information relating to control output from one of the onboard apparatuses 3 by referencing the identification information.

According to the present embodiment, the second onboard apparatus is the failure detection ECU 331, and the onboard apparatus 3 which is the target for priority determination by the control unit 20 is the lamp apparatus 301.

In this aspect, the second onboard apparatus is the failure detection ECU 331 and the onboard apparatus 3 which is the target for priority determination by the control unit 20 is the lamp apparatus 301. Thus, for example, in a case where the control unit 20 acquires information relating to a failure in the vehicle C from the failure detection ECU 331, priority determination is performed on the basis of the information, and a control signal for causing the lamp apparatus 301 to turn on or flash the lamps (headlamps) can be efficiently performed. The processing relating to determining the priority of each control targeting the lamp apparatus 301 is also performed by the vehicle control apparatus (integrated ECU 6). However, because the control unit 20 determines the priority on the basis of the information from the failure detection ECU 331, processing including waiting for a response from the vehicle control apparatus (integrated ECU 6) is unnecessary, and control with a high urgency can be efficiently performed.

Figure 4:
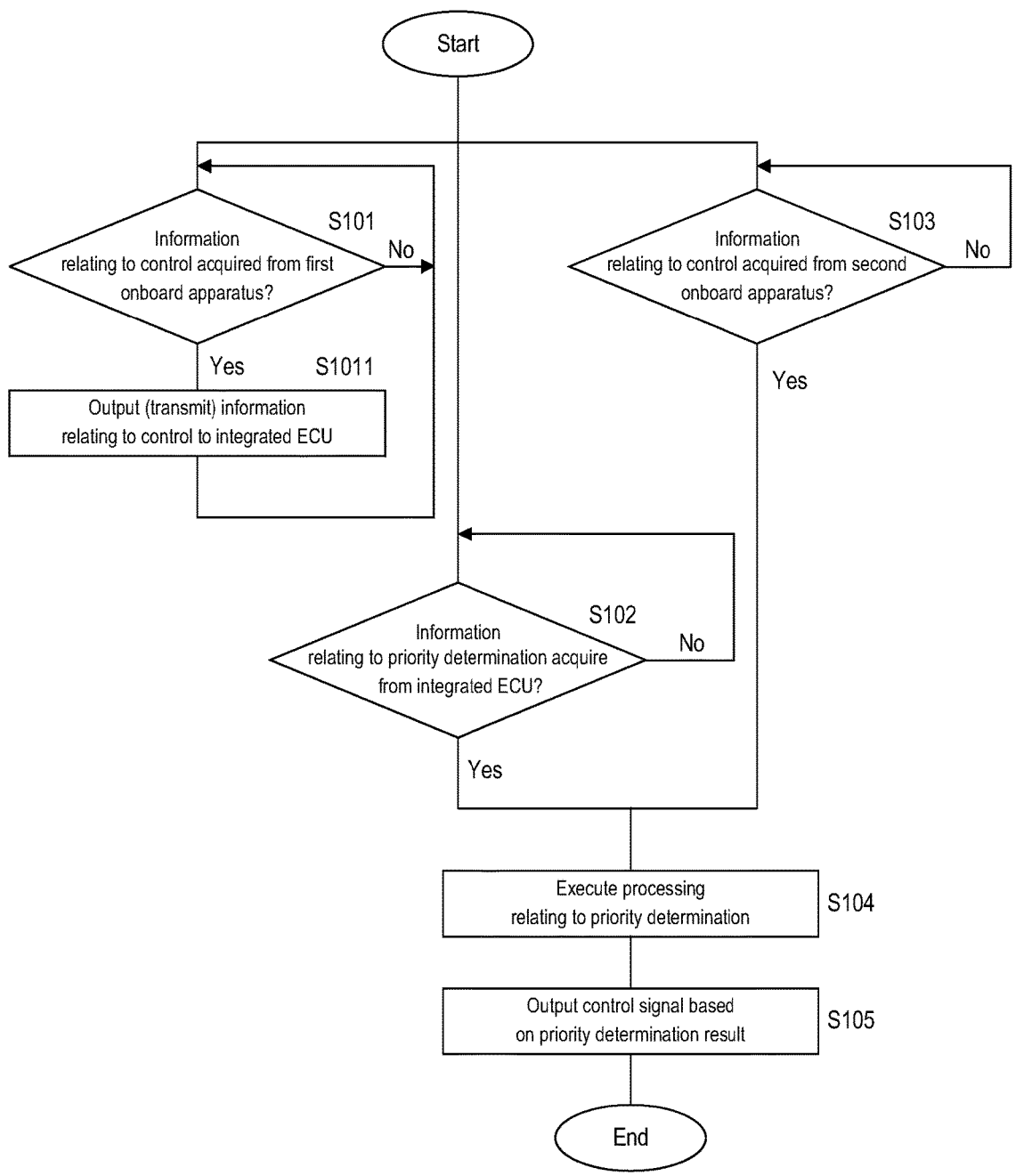
FIG. 4 is a flowchart illustrating an example of the processing of the control unit of the individual ECU (onboard ECU).

FIG. 4 is a flowchart illustrating an example of the processing of the control unit 20 of the individual ECU 2. The control unit 20 of the individual ECU 2 regularly executes the following processing when the vehicle C is in an activated state (an ignition switch 32 is on), for example.

The control unit 20 of the individual ECU 2 determines whether information relating to control has been acquired from the first onboard apparatus (step S101). The control unit 20 determines whether or not information relating to control has been acquired from the first onboard apparatus connected via the CAN communication unit 232 or the like. In a case where information relating to control has not been acquired from the first onboard apparatus (no in step S101), the control unit 20 of the individual ECU 2 executes loop processing to execute the processing of step S101 again.

In a case where information relating to control has been acquired from the first onboard apparatus (yes in step S101), the control unit 20 of the individual ECU 2 outputs (relays) the information relating to control acquired from the first onboard apparatus to the integrated ECU 6 (step S1011). The control unit 20 references the relay path information, for example, and outputs (relays) the information relating to control acquired from the first onboard apparatus to the integrated ECU 6.

The control unit 20 of the individual ECU 2 determines whether information relating to the priority determination result has been acquired from the integrated ECU 6 (step S102). In a case where information relating to the priority determination result has not been acquired from the integrated ECU 6 (no in step S102), the control unit 20 of the individual ECU 2 executes loop processing to execute the processing of step S102 again. In a case where information relating to the priority determination result has been acquired from the integrated ECU 6 (yes in step S102), the control unit 20 of the individual ECU 2 executes processing relating to priority determination (step S104).

The control unit 20 of the individual ECU 2 determines whether information relating to control has been acquired from the second onboard apparatus (step S103). In a case where information relating to control has not been acquired from the second onboard apparatus (no in step S103), the control unit 20 of the individual ECU 2 executes loop processing to execute the processing of step S103 again. In a case where information relating to control has been acquired from the second onboard apparatus (yes in step S103), the control unit 20 of the individual ECU 2 executes processing relating to priority determination (step S104).

The control unit 20 of the individual ECU 2 may execute the processing of steps S101, S102, and S103 using concurrent processing or parallel processing. The control unit 20 of the individual ECU 2, for example, may generate the processes for executing processing including processing for waiting for information to be output from the first onboard apparatus, processing for waiting for information to be output from the individual ECU 2, and processing for waiting for information to be output from the second onboard apparatus as a plurality of resident processes and execute the plurality of processing in parallel.

In a case where the information relating to the priority determination result has been acquired from the integrated ECU 6 (yes in step S102), in a case where the information relating to control has been acquired from the second onboard apparatus (yes in step S103), or in a case where both information relating to the priority determination result from the integrated ECU 6 and information relating to control from the second onboard apparatus have both been acquires at roughly the same time or within a predetermined amount of time, the control unit 20 of the individual ECU 2 executes processing relating to priority determination (step S104). In a case where only information relating to control has been acquired from the second onboard apparatus at roughly the same time or within the predetermined period, the control unit 20 executes processing relating to determining the priority on the basis of the information. In a case where only information relating to the priority determination result has been acquired from the integrated ECU 6 at roughly the same time or within the predetermined period, the control unit 20 executes processing relating to determining the priority on the basis of the information. In a case where information relating to the priority determination result from the integrated ECU 6 and information relating to control from the second onboard apparatus have both been acquired at roughly the same time or within the predetermined period, the control unit 20 determines the priority, prioritizing information relating to control from the second onboard apparatus.

The control unit 20 of the individual ECU 2 outputs the control signal based on the priority determination result (step S105). The control unit 20 generates, as a control signal based on the priority determination result, a relay control signal for the relay control unit 24 connected to the actuator 30 which is the target for priority determination indicating on or off and outputs the relay control signal. The relay control unit 24 having received an input of the relay control signal is driven in accordance with the relay control signal and performs drive control of the actuator 30 connected to the relay control unit 24.

According to the present embodiment, with the plurality of onboard apparatuses 3 such as the actuator 30 which is the target for priority determination, at least a portion of the onboard apparatuses 3 overlap at the individual ECU 2 and the integrated ECU 6, and thus priority determination processing is executed. Accordingly, processing relating to determining the priority of the same onboard apparatus 3 is split or shared by the integrated ECU 6 and the individual ECU 2, which is a separate apparatus to the integrated ECU 6. Thus, the load of the processing relating to priority determination is distributed and the priority determination of control requiring urgency is taken on by the individual ECU 2. This improves responsiveness. Because priority determination by the control unit 20 of the individual ECU 2 is prioritized over priority determination by the integrated ECU 6, delay can be minimized or prevented in the priority determination for the onboard apparatus 3 which is the target for priority determination and control based on the priority determination result.

According to the present embodiment, the onboard apparatus 3 (second onboard apparatus) that outputs information relating to control with high urgency and the onboard apparatus 3 which is the target for priority determination are directly connected to the I/O interface 22 or the relay control unit 24 of the individual ECU 2. Thus, overhead caused by communication delay and the like can be reduced, information or a signal relating to control based on the priority determination result can be efficiently outputs to the onboard apparatus 3 which is the target for priority determination, and responsiveness can be improved.

The embodiments disclosed herein are examples in all respects and should not be interpreted as limiting in any manner. The scope of the present disclosure is defined not by the foregoing description, but by the scope of the claims, and all modifications that are equivalent to or within the scope of the claims are included.

The invention claimed is:

1. An onboard ECU communicatively connected to a plurality of onboard apparatuses installed in a vehicle and a vehicle control apparatus that performs priority determination relating to control of the onboard apparatuses, the onboard ECU comprising:
a control unit that executes processing relating to the control of the onboard apparatuses, wherein
in a case where there is conflict in control, between the control unit and the vehicle control apparatus, targeting one onboard apparatus from among the plurality of onboard apparatuses or an associated onboard apparatus group, the control unit determines priority of the control; and
an onboard apparatus which is a target for priority determination by the control unit and an onboard apparatus which is a target for priority determination by the vehicle control apparatus overlap at least at a portion; and
wherein the processing includes determining the priority is executed by both an onboard apparatus which is a target for priority determination by the control unit and an onboard apparatus which is a target for priority determination by the vehicle control unit;
wherein priority determination by the control unit is prioritized over priority determination by the vehicle control apparatus.

2. The onboard ECU according to claim 1, further comprising a relay control unit that supplies or cuts off supply of electric power to a communication unit for communicating with the onboard apparatuses or the onboard apparatuses, wherein
the onboard apparatus which is a target for priority determination by the control unit is directly connected to the ECU via one of the communication unit and the relay control unit.

3. The onboard ECU according to claim 1, wherein the plurality of onboard apparatuses include a first onboard apparatus and a second onboard apparatus that outputs information relating to control with a higher urgency than information relating to control output by the first onboard apparatus; and
the control unit, in a case where information relating to control output from the first onboard apparatus has been acquired, relays the information relating to control output from the first onboard apparatus to the vehicle control apparatus, and in a case where information relating to control output from the second onboard apparatus has been acquired, the control unit executes processing for determining priority on the basis of the information relating to control output from the second onboard apparatus.

4. The onboard ECU according to claim 3, wherein in a case where the control unit acquires information relating to control based on a result of priority determination by the vehicle control apparatus, and acquires the information relating to control output from the second onboard apparatus, the control unit executes processing for determining priority on the basis of information relating to control based on the acquired result of priority determination by the vehicle control apparatus and the information relating to control output from the second onboard apparatus.

5. The onboard ECU according to claim 3, wherein a level of an urgency is determined on the basis of Automotive Safety Integrity Level (ASIL) of ISO26262; and
the urgency of the control increases as a safety level of ASIL relating to control targeting an onboard apparatus which is a target for priority determination increases.

6. The onboard ECU according to claim 1, wherein in a case where an interrupt processing is included in the conflicting plurality of controls, the control unit prioritizes the interrupt processing over the priority determination made by the vehicle control apparatus and determines priority for the conflicting plurality of controls.

7. The onboard ECU according to claim 6, wherein the onboard apparatus that outputs information relating to the interrupt processing is directly connected to the ECU.

8. An information processing method that causes a computer to execute processing including:
determining priority for controls in a case where there is a conflict between controls from an onboard ECU and a vehicle control apparatus, both targeting an onboard apparatus or an onboard apparatus group which is a target for priority determination, wherein a processing relating to determining the priority for the target onboard apparatus is split between the vehicle control apparatus and the onboard ECU.

9. An onboard system, comprising:
a vehicle control apparatus communicatively connected to a plurality of onboard apparatuses installed in a vehicle; and
a plurality of onboard ECUs communicatively connected to the plurality of onboard apparatuses, wherein
the onboard ECUs and the vehicle control apparatus include a control unit that, in a case where there are conflicting controls targeting one of the onboard apparatuses or an associated onboard apparatus group from among the plurality of onboard apparatuses, performs priority determination for the controls; and
an onboard apparatus which is a target for priority determination by the control unit of the onboard ECUs and an onboard apparatus which is a target for priority determination by the control unit of the vehicle control apparatus overlap at least at a portion, wherein a processing relating to determining the priority for the target onboard apparatus is split between the vehicle control apparatus and the onboard ECU.

10. The onboard ECU according to claim 1, further comprising a relay control unit that supplies or cuts off supply of electric power to a communication unit for communicating with the onboard apparatuses or the onboard apparatuses, wherein the onboard apparatus which is a target for priority determination by the control unit is directly connected to the ECU via one of the communication unit and the relay control unit.

11. The onboard ECU according to claim 1, wherein the plurality of onboard apparatuses include a first onboard apparatus and a second onboard apparatus that outputs information relating to control with a higher urgency than information relating to control output by the first onboard apparatus; and the control unit, in a case where information relating to control output from the first onboard apparatus has been acquired, relays the information relating to control output from the first onboard apparatus to the vehicle control apparatus, and in a case where information relating to control output from the second onboard apparatus has been acquired, the control unit executes processing for determining priority on the basis of the information relating to control output from the second onboard apparatus.

12. The onboard ECU according to claim 2, wherein the plurality of onboard apparatuses include a first onboard apparatus and a second onboard apparatus that outputs information relating to control with a higher urgency than information relating to control output by the first onboard apparatus; and the control unit, in a case where information relating to control output from the first onboard apparatus has been acquired, relays the information relating to control output from the first onboard apparatus to the vehicle control apparatus, and in a case where information relating to control output from the second onboard apparatus has been acquired, the control unit executes processing for determining priority on the basis of the information relating to control output from the second onboard apparatus.

13. The onboard ECU according to claim 4, wherein a level of an urgency is determined on the basis of Automotive Safety Integrity Level (ASIL) of ISO26262; and the urgency of the control increases as a safety level of ASIL relating to control targeting an onboard apparatus which is a target for priority determination increases.

14. The onboard ECU according to claim 1, wherein in a case where an interrupt processing is included in the conflicting plurality of controls, the control unit prioritizes the interrupt processing over the priority determination made by the vehicle control apparatus and determines priority for the conflicting plurality of controls.

15. The onboard ECU according to claim 2, wherein in a case where an interrupt processing is included in the conflicting plurality of controls, the control unit prioritizes the interrupt processing over the priority determination made by the vehicle control apparatus and determines priority for the conflicting plurality of controls.

16. The onboard ECU according to claim 3, wherein in a case where an interrupt processing is included in the conflicting plurality of controls, the control unit prioritizes the interrupt processing over the priority determination made by the vehicle control apparatus and determines priority for the conflicting plurality of controls.

17. The onboard ECU according to claim 4, wherein in a case where an interrupt processing is included in the conflicting plurality of controls, the control unit prioritizes the interrupt processing over the priority determination made by the vehicle control apparatus and determines priority for the conflicting plurality of controls.

18. The onboard ECU according to claim 5, wherein in a case where an interrupt processing is included in the conflicting plurality of controls, the control unit prioritizes the interrupt processing over the priority determination made by the vehicle control apparatus and determines priority for the conflicting plurality of controls.

* * * * *